UNITED STATES PATENT OFFICE.

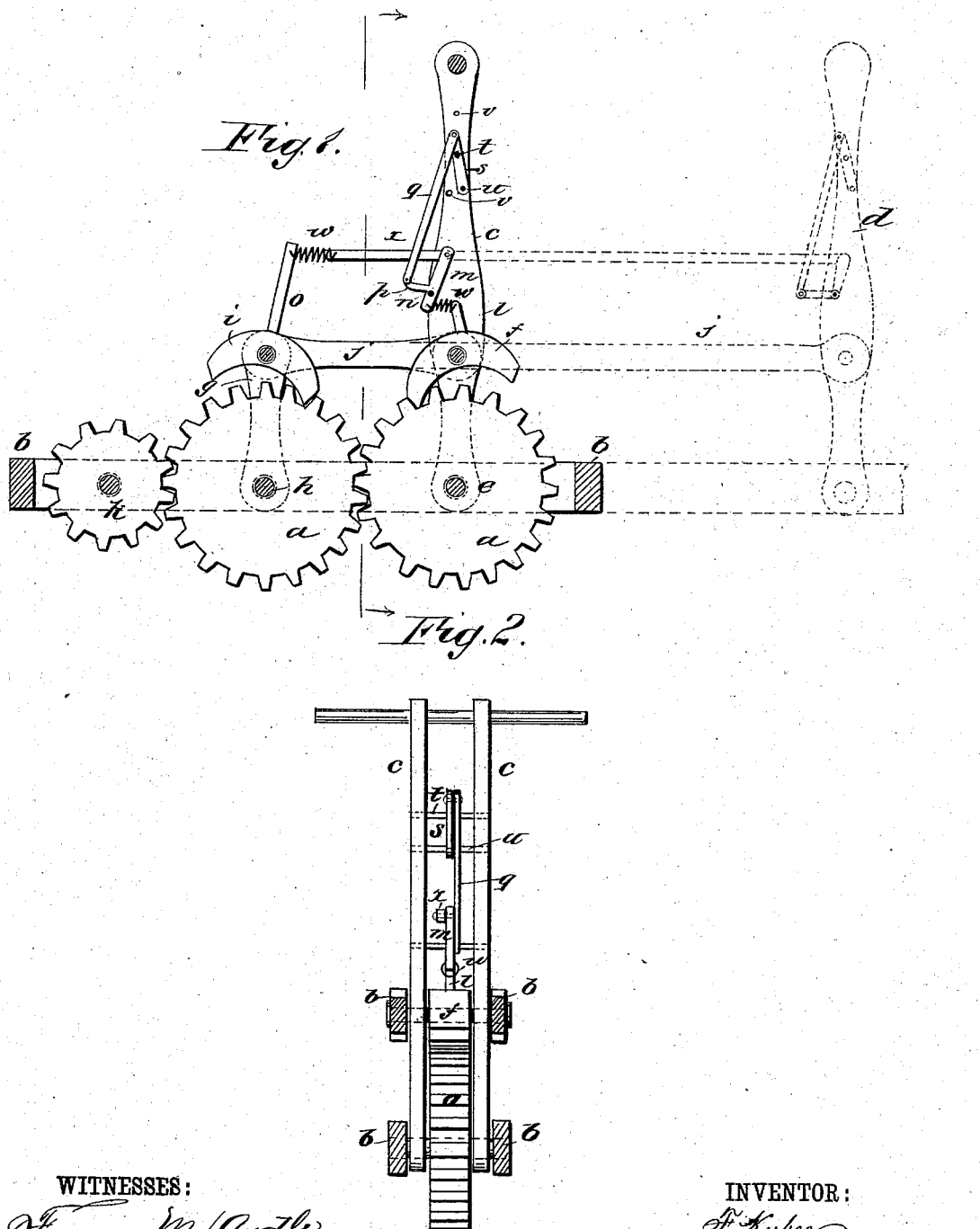

FREDERICK KUBEC, OF RIVERSIDE, IOWA.

LEVER-POWER MECHANISM.

SPECIFICATION forming part of Letters Patent No. 295,498, dated March 18, 1884.

Application filed January 22, 1884. (No model.)

*To all whom it may concern:*

Be it known that I, FREDERICK KUBEC, of Riverside, county of Washington, Iowa, have invented a new and Improved Lever-Power Mechanism, of which the following is a full, clear, and exact description.

My invention consists of an improved reversing contrivance for lever-power mechanism, contrived to effect continuous rotary motion by means of a vibrating lever, to which the power is applied, as hereinafter fully described.

Reference is to be had to the accompanying drawings, forming part of this specification, in which similar letters of reference indicate corresponding parts in both figures.

Figure 1 is a longitudinal sectional elevation of my improved lever-power apparatus, and Fig. 2 is a front elevation.

To a pair of toothed wheels, $a$, mounted so as to gear with each other in a frame, $b$, a working-lever, $c$, is connected by being pivoted on the axle $e$ of one of said wheels, with a pawl, $f$, working in the teeth of said wheels. A pawl-lever, $g$, similarly fitted on the axle $h$ of the other wheel, has a pawl, $i$, working in the teeth of said wheels, said working-lever $c$ and pawl-lever $g$ being connected by a rod, $j$, so that by the working of the lever $c$ forward and backward the wheels $a$ will be alternately turned in the opposite directions in which they run together, said pawls $f$ and $i$ being fitted to work in the reverse directions in which the wheels turn, so that when the lever $c$ is shifted one way one of the wheels will be turned accordingly, and when said lever is turned the other way the other pawl takes effect on the other wheel, thus effecting continuous rotary motion which may be transmitted to any object to be revolved either by the wheel $k$ or by one of the axles of one of the wheels $a$. The lever $d$ is to be employed when it may be preferred to locate the working-lever at a distance from the wheels, the rod $j$ being then extended at $j'$ to lever $d$.

The present invention consists of means of reversing the pawls $f$ and $i$ at the will of the operator, when it may be desired to reverse the motion of the object to be driven For this purpose pawl $f$ has a rigid arm, $l$, connected to the short rock-lever $m$, pivoted to lever $c$ at $n$, and pawl $i$ also has a rigid arm, $o$, connected to rock-lever $m$, said arms being connected to the opposite ends of lever $m$, and on opposite sides of its pivot $n$. The rock-lever $m$ has a rigid arm, $p$, that is connected by rod $q$ with the short arm of a lever, $s$, pivoted to lever $c$ at $t$, by which lever $m$ may be readily turned to reverse the pawls $f$ and $i$. The lever $s$ has a pin, $u$, to fasten in the respective positions to which it may be shifted, by inserting said pin in holes $v$ of the lever $c$. The arms $l$ and $o$ of the pawls $f$ and $i$ are connected to the lever $m$ with springs $w$, to allow the pawls to rise and fall according as the teeth and notches require. Owing to the greater distance of pawl $i$ from lever $m$, a rod, $x$, is arranged between the spring and said lever. The working-levers $c$ or $d$ are to have footpower connection to employ both hand and foot power when required. It is preferred to arrange double levers $c$ and $g$, one on each side of the wheels, as the best practicable arrangement; but sometimes they will be arranged singly.

Having thus described my invention, I claim as new and desire to secure by Letters Patent—

1. In a lever-power consisting of two wheels, $a$, with a working-lever and ratchet-pawls, arranged as described, the pawls $f$ and $i$, connected, respectively, to the arms of a rock-lever, $m$, and said lever $m$ connected to a working-lever, $s$, substantially as specified.

2. In a lever-power consisting of two wheels, $a$, with a working-lever and ratchet-pawls, arranged as described, the pawls $f$ and $i$, connected, respectively, to the arms of a rock-lever, $m$, by rigid arms $l$ $o$ and springs $w$, and said rock-lever $m$ connected to a working-lever, $s$, substantially as specified.

3. In a lever-power consisting of two wheels, $a$, with a working-lever, $c$, and ratchet-pawls, arranged as described, the pawls $f$ and $i$, connected, respectively, to the arms of a rock-lever, $m$, pivoted on said lever $c$, and said rock-lever connected to a working-lever, $s$, also pivoted on the lever $c$, substantially as specified.

FREDERICK KUBEC.

Witnesses:
ALBERT KALLANS,
J. P. MCCLUSKEY.